United States Patent [19]

McGuire et al.

[11] Patent Number: 5,017,197

[45] Date of Patent: May 21, 1991

[54] GLOVE BAG AND METHOD OF USE

[76] Inventors: Thomas F. McGuire, Rte. 231, Box 330A, Hughesville, Md. 20637; John Noyes, III, 18933 Glendower Rd., Gaithersburg, Md. 20879

[21] Appl. No.: 433,950

[22] Filed: Nov. 9, 1989

[51] Int. Cl.[5] ........................ B01D 49/00; F24F 11/00

[52] U.S. Cl. ............................................ 55/1; 55/97; 55/385.2; 98/115.3; 98/115.4

[58] Field of Search ..................... 55/1, 97, 385.2, 467; 98/115.3, 115.4

[56] References Cited

U.S. PATENT DOCUMENTS

| | | | |
|---|---|---|---|
| 1,977,386 | 10/1934 | Holes | 98/115.3 |
| 4,059,903 | 11/1977 | Piet et al. | 98/115.3 |
| 4,108,509 | 8/1978 | Piet et al. | 98/115.3 |
| 4,505,190 | 3/1985 | Fink et al. | 98/115.1 |
| 4,584,930 | 4/1986 | Connolly | 98/115.3 |
| 4,626,291 | 12/1986 | Natale | 98/115.3 |
| 4,704,951 | 11/1987 | Pruchon | 55/385.2 |
| 4,809,391 | 3/1989 | Soldatovic | 55/385.2 |
| 4,812,700 | 3/1989 | Natale | 98/115.4 |
| 4,911,191 | 3/1990 | Bain | 55/395.2 |
| 4,929,261 | 5/1990 | Jacobson | 55/321 |

*Primary Examiner*—Jay H. Woo
*Assistant Examiner*—C. Scott Bushey
*Attorney, Agent, or Firm*—Epstein, Edell & Retzer

[57] ABSTRACT

A sealed glove bag for containing and disposed of asbestos particles released during work on a pipe section is continuously ventilated by negative pressure applied at an exhaust port. An inlet port permits replacement ambient air to enter the bag and is provided with a HEPA-type filter to prevent asbestos particles from escaping via the inlet port. A similar filter may be placed at the exhaust port to prevent the particles from egressing via the exhaust port. In order to prevent collapse of the glove bag from the negative pressure, the bag is configured with a flat bottom and spaced walls, preferably in the form of a rectangular parallelepiped, that is reinforced with an insert configured to overlie the flat bottom and extend a short distance upwardly along the walls.

20 Claims, 2 Drawing Sheets

GLOVE BAG AND METHOD OF USE

BACKGROUND OF THE INVENTION

1. Technical Field

The present invention relates to a method and apparatus for removing hazardous waste materials, such as particulate matter and fluids, from localized work spaces. More particularly, the invention relates to an improved glove bag and its method of use in connection with confining and removing such materials from the work space about a pipe section coated with or containing the hazardous material. The preferred embodiment of the present invention is described in connection with protecting a worker from exposure to asbestos particles during removal of asbestos coatings or insulation from a pipe; however, it is to be understood that the invention has broader utility and may serve to prevent the worker from exposure to any other type of hazardous particles or fluids.

2. Discussion of the Prior Art

It is long been known to utilize glove bags to protect workers from exposure to hazardous materials. Examples of such glove bags thusly utilized may be found in U.S. Pat. Nos.: 4,626,291 (Natale); 4,812,700 (Natale); 4,783,129 (Jacobson); 4,820,000 (Jacobson); 4,842,347 (Jacobson); 4,746,175 (Hamlet et al). Other glove bags and related apparatus are disclosed in Canadian Patent No. 1,188,191 (Atkinson); British Patent No. 1,567,270 (Atkinson); U.S. Pat. No. 4,809,391 (Soldatovic); and U.S. Pat. No. 4,604,111 (Natale). These prior art glove bags are typically made of transparent polyethylene, polyvinylchloride, or other similar collapsible sheet material having one end that can be wrapped about a section of pipe and sealed against the pipe to prevent leakage. The other end of the bag takes the form of a seam toward which the front and back sides of the bag converge to direct and collect waste material falling from the pipe section. Glove-like sleeves extend into the bag to permit the worker to perform the necessary work functions on the enclosed pipe section. Before stripping asbestos from the pipe section, a waste hose or nozzle is typically inserted through a sealable port to permit the pipe section to be wetted. As the asbestos coating is stripped, the heavier wetted asbestos particles tend to fall and be collected at the bottom seam of the bag, thereby reducing the amount of airborne asbestos particles in the work space. After the stripping operation is completed, a tube attached to a vacuum source is inserted through the same or a different sealable port to remove any remaining airborne asbestos particles while partially collapsing the bag. The bag is sealed by twisting and tying or taping it closed with the enclosed debris in the bottom portion of the bag, which is then removed from the pipe section and disposed of pursuant to prescribed safety procedures.

Prior art glove bags have proven to be less safe for the worker than desirable. More particularly, if the seal about the pipe is not complete, it is possible to contaminate the surrounding environment with asbestos particles during the stripping operation. Moreover, even if there is a proper seal about the pipe section, when suction is applied to the bag after the stripping operation, the bag tends to prematurely collapse before all of the particles inside the bag can be drawn into the suction tube. Consequently, upon removal of the bag from the pipe section, a considerable quantity of asbestos particles escapes into the environment.

It has been proposed (see the Natale U.S. Pat. Nos. 4,626,291 and 4,812,700) that a low level of suction be maintained in the bag during the stripping operation by means of a suction tube inserted through the self-sealing access port. However, this has not proven to be practical. Specifically, if the bag is properly sealed about the pipe section, applied suction forces cause the bag to collapse and prevent wetted particles of asbestos from falling to the bottom for safe collection. The only way to prevent the Natale bag from collapsing is to provide an incomplete seal about the pipe section, or elsewhere in the bag. This, however, sacrifices safety since the asbestos particles are able to escape through the incomplete seal or other opening.

Another prior art waste containment system is disclosed in U.S. Pat. No. 4,505,190 (Fink et al). This patent discloses an exhaust hood made from collapsible transparent material supported by a rigid framework of rods along the edges of the hood walls. The hood is secured about a pipe section and includes a lid that may be opened to provide manual access to the hood interior. A suction tube communicates with the hood interior to continuously draw air therefrom. Replacement air is provided via the open manual access lid. This hood approach is not safe for asbestos removal operations since the worker's gloves, which are not part of the hood, and other clothing become contaminated.

OBJECTS AND SUMMARY OF THE INVENTION

A primary object of the present invention is to provide an improved glove bag and method of using same that avoid the safety comprises inherent in prior art glove bags described above.

It is a more specific object of the present invention to provide an improved glove bag that permits air to flow through the bag continuously during asbestos stripping, or other work functions, without causing the bag to collapse and without significant risk of escaping asbestos particles during or after the stripping operation.

It is also a more specific object of the present invention to provide a method of using a glove bag in a manner to cause air to continuously flow therethrough during an asbestos stripping or other work operation without any significant risk of asbestos particles escaping into the surrounding environment.

According to the present invention, a glove bag of the general type described above is provided with a exhaust port and an inlet port. A low level vacuum source connected to the exhaust port causes air to be continuously aspirated from the bag during an asbestos stripping operation or similar work function. In order to prevent the bag from collapsing, replacement ambient air is supplied to the bag interior via the inlet port. Importantly, in order to prevent asbestos particles from egressing to the ambient environment, a high efficiency particle air filter (i.e., HEPA-type filter) is disposed over the inlet port. A similar filter may also be placed over the exhaust port leading to the suction source. To further prevent collapse of the bag, the bottom of the bag is constructed as a rectangular parallelepiped, rather than a downwardly converging funnel shape, and is provided with a reinforcing member. The reinforcing member preferably takes the form of a cardboard insert having a rectangular portion disposed on the interior surface of the rectangular bottom wall of the bag. The insert preferably includes flaps extending upwardly along two or more of the bag sidewalls. In operation, a continuous exhaust ventilation is provided through the bag without danger of the bag collapsing, thereby assuring that an airborne asbestos particles inside the bag are contained in the bag or drawn out only through the vacuum source, depending on whether or not there is a filter disposed at the exhaust port.

BRIEF DESCRIPTION OF THE DRAWINGS

These and other objects, features and many of the attendant advantages of the present invention will be appreciated more readily as they become understood from a reading of the following description considered in connection with the accompanying drawings wherein like parts in each of the several figures are identified by the same reference numerals, and wherein.

DESCRIPTION OF THE PREFERRED EMBODIMENT

Figure 3:
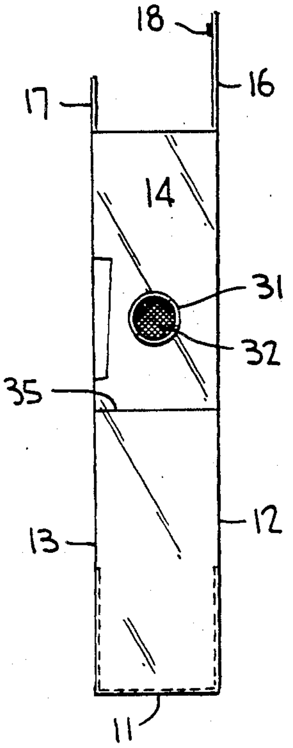
FIG. 3 is a left side view in elevation of the glove bag of FIG. 1.
Figure 1:
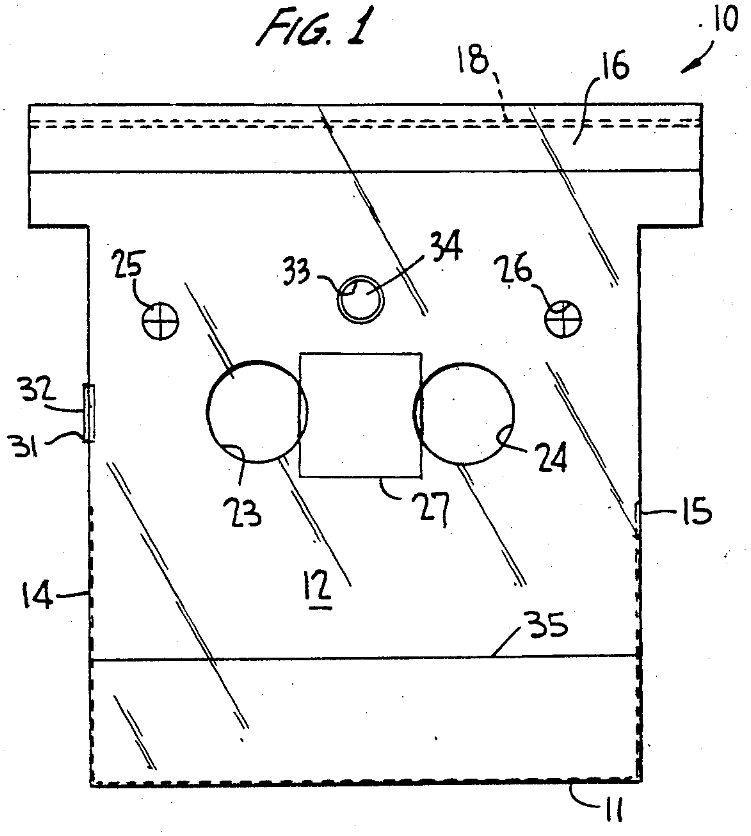
FIG. 1 is a front view in elevation of a glove bag of the present invention.
Figure 2:
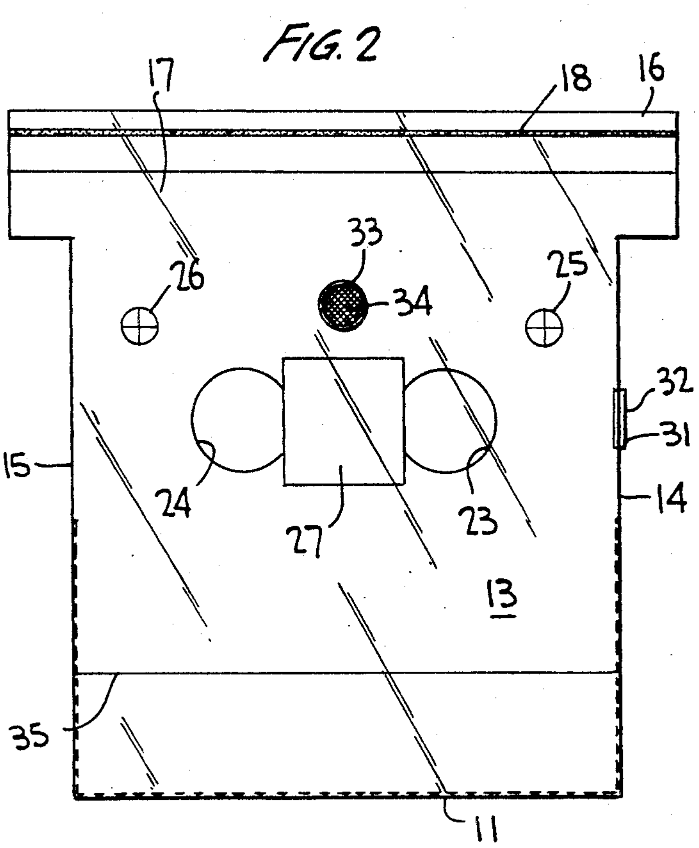
FIG. 2 is a rear view in elevation of the glove bag of FIG. 1.
Figure 4:
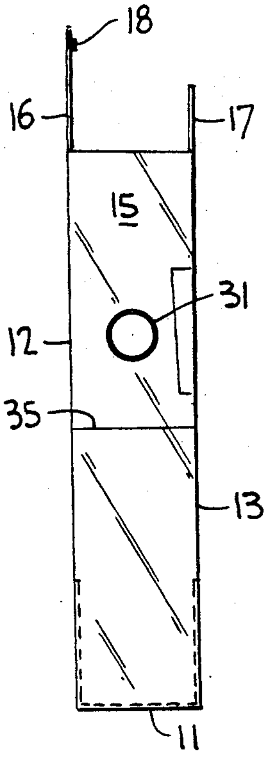
FIG. 4 is a right side view in elevation of the glove bag of FIG. 1.
Figure 5:
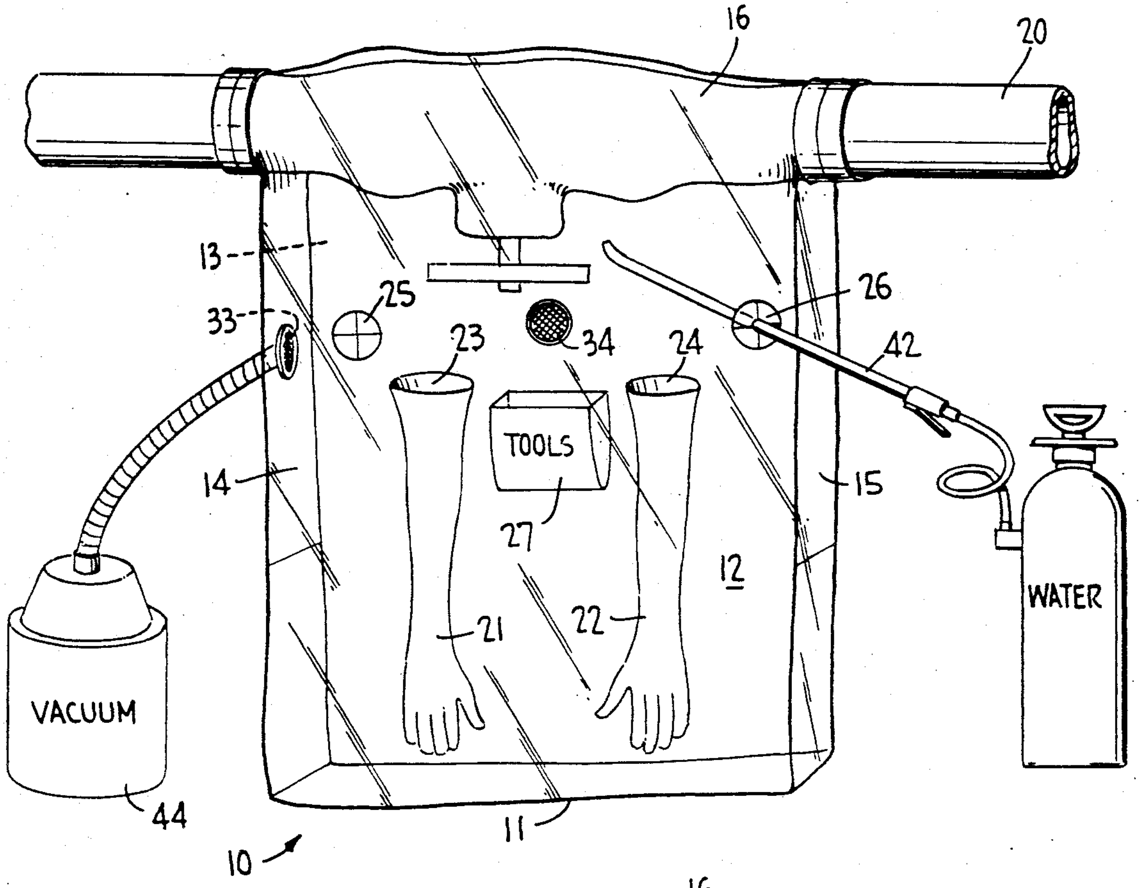
FIG. 5 is a front view in perspective of the glove bag of FIG. 1 installed on a pipe section, and a diagrammatic illustration of the method of using the glove bag.

Referring specifically to the accompanying drawings, a glove bag 10 of the present invention is transparent and collapsible and naturally assumes a generally rectangular parallelepiped configuration when suspended from a pipe section 20 upon which work is to be done. The bag has a flat rectangular bottom wall 11 and generally rectangular front and back walls 12 and 13, respectively, spaced in parallel relation by generally rectangular left and right sidewalls 14 and 15, respectively. The width of front wall 12 and back wall 13 is considerably greater than the width of sidewalls 14 and 15 and determines the length of pipe section that may be isolated by glove bag 10 for asbestos stripping or other work functions. The width of the sidewalls 14 and 15, on the other hand, determines the depth dimension of glove bag 10 and is selected to accommodate the range of pipe diameters with which the bag is used.

The upper end portions 16 and 17 of front wall 12 and rear wall 13, respectively, extend beyond the top edge of sidewalls 14 and 15 and preferably extend transversely beyond those sidewalls. Upper portion 16 of front wall 12 is longer than upper portion 17 of rear wall 13 and is sized to overlap upper portion 17 when these portions are disposed circumferentially about the pipe section 20 on which work is to be performed. A strip 18 of adhesive material extends along substantially the entire width of the inside surface of upper portion 16 so that upper portions 16 and 17 can be sealed together to form a sleeve about pipe section 20. The ends of the sleeve are typically taped to the outer surface of the pipe section to seal the sleeve ends before any work is done on the enclosed pipe. This precludes any leakage of air into or out of the bag via the sleeves disposed about the pipe.

Two or more sealed sleeve and glove units 21, 22 are heat sealed or otherwise sealingly secured to the front wall 12 at suitably provided openings 23, 24, respectively. The gloves provide sealed manual access to the enclosed pipe section and permit the worker to perform intended functions on that pipe section. The sleeve portions of units 21, 22 are conventional and are typically made from a plastic material sold by DuPont under the name TYVEK. The glove portions are likewise conventional and are typically made of latex.

A pair of sealable access ports 25, 26 are defined through front wall 12 to permit insertion of a water supply tube into the bag to wet the asbestos coating of the enclosed pipe section 20. Access ports 25, 26 may, for example, be of the type disclosed in Natale U.S. Pat. No. 4,626,291 or in the Jacobson U.S. Pat. No. 4,783,129. The access ports 25, 26 may be used for other purposes, such as insertion of a tube from a supply of compressed air, or the like. A conventional tool pouch 27 is disposed on the inside surface of rear wall 13.

An exhaust port 31 is defined through left sidewall 14 and may be covered by a suitable HEPA-type filter 32. An ambient air inlet port 33 is defined through r®ar wall 13 and must be covered by a HEPA-type filter 34. HEPA-type filters are generally referred to as "absolute" filters and are disclosed in U.S. Pat. Nos. 3,936,284, 3,498,032, 4,175,934 and 4,191,543, the disclosures from which are expressly incorporated herein by this reference. Filter 34 prevents asbestos particles from escaping through inlet port 33, a situation that might otherwise occur if suction forces are removed from exhaust port 31. Filter 32 is optional, depending upon whether the intention is to collect asbestos particles with the filter at a location inside the glove bag or to collect the asbestos particles in the external exhaust equipment.

Ambient replacement air received through inlet port 33 and filter 34 permits continuous air flow through the bag when a source of negative pressure is applied to exhaust port 31. The replacement air, in combination with the enlarged rectangular parallelepiped configuration of the bag, also functions to somewhat prevent the bag from collapsing in response to the applied negative pressure. Additionally, prevention against collapse is provided by reinforcing the bag so that it is constrained to retain its generally rectangular parallelepiped configuration. In the preferred embodiment of the present invention, this reinforcement function is achieved with a reinforcing member 35 having a rectangular base portion sized to correspond to the rectangular interior surface of bottom wall 11. Additional portions of the reinforcement member 35 extend upwardly a short distance along the two side walls 14, 15. Alternatively, the reinforcement member 35 may extend upwardly a short distance along front wall 12 and back wall 13, or along all four walls 12, 13, 14 and 15. In any case, the upwardly extending portions extend along the entire width of the corresponding wall so that its edges prevent collapse of the adjacent wall. The reinforcement member is preferably fabricated from cardboard that remains sufficiently rigid, when contacted by the water utilized to wet the asbestos material on the pipe, to prevent the bag from collapsing due to the applied negative pressure at exhaust port 31. On the other hand, the wet cardboard reinforcement member is readily intentionally crumpled after the bag has been used and is ready to be thrown away.

Typically, reinforcement member 35 is supplied separate from the glove bag and is inserted into the bag by the worker before installing the bag on a pipe section. Alternatively, the reinforcement member may be presecured in place within the bag so that the worker can avoid the steps of inserting the reinforcement member. Other techniques for reinforcing the bag may be employed within the scope of the present invention. For example, the thickness of the bottom wall and lower portions of the front, back and side walls may be increased as necessary to prevent collapse of the bag due to negative pressure. However, the cardboard insert is the preferred approach.

Figure 6:
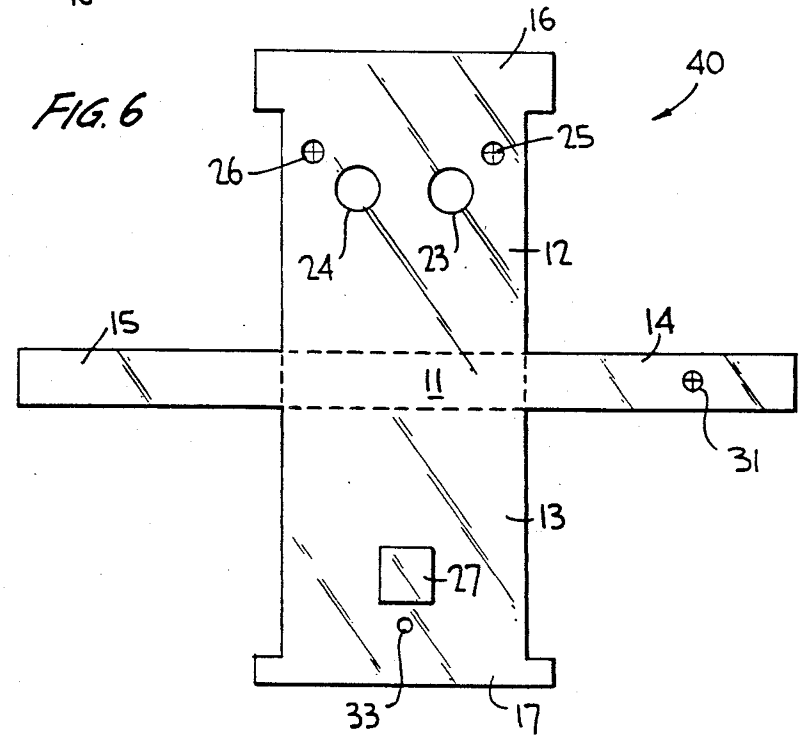
FIG. 6 is a view in plan of a blank of transparent plastic sheet material from which the glove bag is formed.

The glove bag is fabricated from a unitary single-piece blank 40 cut from a sheet of the transparent collapsible plastic material, as illustrated in FIG. 6. Blank 40 includes four basic rectangular sections 12, 13, 14 and 15 extending from opposite sides of a fifth rectangular section 11. These five sections correspond to the similarly numbered walls of bag 10. To form the bag, each section 12, 13, 14 and 15 is folded along its respective shared edge with section 11 so that the lengthwise edges of these sections are in abutting relation. The four pairs of abutting edges are then heat sealed to form the bag. As an alternative to providing sidewalls 14 and 15 as separately extending sections of blank 40, each sidewall section may be cut as part of one of the front or back wall sections so that only two heat sealed joints need be formed.

In operation, the glove bag is secured to pipe section 20 by overlapping upper sections 16 and 17 above the pipe section and sealingly securing these sections by means of adhesive strip 18. The ends of the resulting sleeves formed about the pipe section are taped or otherwise sealed adjacent the outside wall of the pipe. With the bag suspended from the pipe section, the worker inserts a nozzle 42 through one or both of the sealable access ports 25 26 and sprays water on the enclosed pipe section to wet the asbestos coating. The nozzle is then removed and a negative pressure is applied to filter 32 at exhaust port 31. Since the required negative pressure is relatively low, the source 44 for such pressure may be a portable hand vacuum unit, such as the Dayton portable hand vacuum model #2Z437. Alternatively, the source may be a MSA International Optimair Model MM powered air purifying respirator, or the like. The negative pressure source draws air from the bag and causes replacement air to be continuously drawn into the bag via filter 34. The worker, completely isolated from the contaminated interior work space, performs the desired stripping or other operations by using gloves 21, 22. Any asbestos particles that are not sufficiently wetted to fall to the bottom of the bag are carried by the continuous negative exhaust air flow to exhaust port 31. If filter 32 is employed, the particles collect on the filter where they are retained and disposed of along with the glove bag after the stripping or other operation is completed. If filter 32 is not employed, the asbestos particles are carried out of the bag to an appropriate collection unit associated with the vacuum source.

There are two important aspects of the apparatus and method described above. First, the enlarged shape of the bottom of the bag, as opposed to the funnel-like prior art bags, prevents the bag from collapsing in response to the applied negative pressure. This enlarged shape is assured by reinforcement member 35. Second, filter 34 prevents asbestos particles from escaping from the bag to the ambient environment via the replacement air inlet port 33.

By way of example only, and without limiting the scope of the present invention, one embodiment of the present invention has been constructed with the following dimensions: width of front wall 12 and rear wall 13, fifty-four inches; width of sidewalls 14 and 15, twelve inches; height of front wall 12 including upper portion 16, sixty-six inches; height of rear wall 13 including upper section 17, sixty inches; transverse length of sleeves projecting from upper sections 16 and 17, six inches at each side; distance above bottom wall of centers of inlet port 33 and exhaust port 31, thirty-six inches.

Although exhaust port 31 and inlet port 33 are defined in the left sidewall 14 and rear wall 13, respectively, in the disclosed embodiment, it is to be understood that these locations are preferable but not limiting on the scope of the present invention. The locations of these ports should be chosen so that the asbestos particles will optimally be drawn into the continuous exhaust air flow.

The preferred embodiment of the invention is described for use in connection with a horizontal pipe section 20. It will be appreciated that the invention is equally applicable for use with vertical pipe sections, or pipes that are neither vertical nor horizontal but skewed. In such cases the bottom of the bag that must be reinforced is located at right angles to the vertical pipe or some other angle to a skewed pipe. In either case, the bottom must be reinforced to preclude collapse of the bag in the presence of applied negative pressure.

The negative pressure source equipment 44 and filters 32, 34 are selected to permit at least one complete air change within the bag interior every fifteen minutes. For a bag having the dimensions set forth in the above-described example, an air flow rate of at least 1.5 cubic feet per minute must be employed. Typically, the bag of the present invention operates with a somewhat higher flow rate.

Although a reinforced rectangular parallelepiped configuration is preferred for the glove bag of the present invention, other reinforced configurations can be employed within the scope of the invention to provide the function of preventing collapse of the bag. The important consideration is to maintain the walls of the bag spaced from one another and thereby avoid closing off the bag interior. A tapered or funnel-shaped bag of the type employed in the prior art closes off and collapses quite readily upon application of negative pressure to the bag interior. A flat bottom, on the other hand, with upstanding walls having no significant taper, minimizes bag collapse, particularly where the configuration is reinforced by an insert or other appropriate reinforcement techniques.

From the foregoing description it will be appreciated that the invention makes available a novel method and apparatus for containing contaminant materials in a glove bag characterized by continuous exhaust ventilation through the bag while work is being performed therein. The continuous exhaust ventilation is achieved, without sacrificing safety, by supplying replacement ambient air into the bag through a HEPA-type filter that prevents contaminant particles from escaping through the inflow port. In order to prevent collapse of the bag upon application of negative pressure to the bag interior, the bag is configured with a flat bottom and upstanding walls reinforced by appropriate means such as a cardboard reinforcement insert.

Having described preferred embodiments of a new and improved glove bag and method of use in accordance with the present invention, it is believed that other modifications variations and changes will be suggested to those skilled in the art in view of the teachings set forth herein. It is therefore to be understood that all such variations, modifications and changes are believed to fall within the scope of the present invention as defined by the appended claims.

What is claimed:

1. Apparatus for enclosing an air-sealed work space and containing hazardous material such as asbestos particles therein to permit disposal of the apparatus and contained particles after work in the work space is completed, said apparatus comprising:

a collapsible transparent bag for defining said work space about a section of pipe on which work is to be performed;

arm sleeve and glove means secured to said bag in air-sealed engagement for permitting a worker located outside said work space to perform work on said section of pipe;

an exhaust port defined in said bag for connection to a source of suction to withdraw air from the bag interior;

a replacement air inlet port defined in said bag for delivering replacement ambient air to the interior of said bag in response to withdrawal of air from said exhaust port; and high efficiency particulate air filter means disposed at said inlet port for permitting ambient air to enter said bag and preventing said hazardous material from escaping from said bag via said inlet port.

2. The apparatus according to claim 1 further comprising additional high efficiency particulate air filter means disposed at said exhaust port for permitting air to be withdrawn from said bag via said exhaust port and preventing said hazardous material from escaping from said bag via said exhaust port.

3. The apparatus according to claim 2 wherein said bag has a substantially flat bottom and spaced walls extending upwardly therefrom to define said work space, wherein said inlet port and said exhaust port are defined in said walls, and further comprising reinforcement means for preventing collapse of said bag in response to negative pressure in the bag interior.

4. The apparatus according to claim 3 wherein said reinforcement means comprises a reinforcement insert panel configured to match the configuration of said bottom for emplacement on said bottom to prevent collapse of said bottom and portions of said walls adjacent said bottom.

5. The apparatus according to claim 4 wherein said panel is cardboard and includes flap portions extending upwardly along said portions of said walls.

6. The apparatus according to claim 5 wherein said bag has a generally rectangular parallelepiped configuration.

7. The apparatus according to claim 1 wherein said bag has a substantially flat bottom and spaced walls extending upwardly therefrom to define said work space, wherein said inlet port and said exhaust port are defined in said walls, and further comprising reinforcement means for preventing collapse of said bag in response to negative pressure in the bag interior.

8. The apparatus according to claim 7 wherein said reinforcement means comprises a reinforcement insert panel configured to match the configuration of said bottom for emplacement on said bottom to prevent collapse of said bottom and portions of said walls adjacent said bottom.

9. The apparatus according to claim 8 wherein said panel is cardboard and includes flap portions extending upwardly along said portions of said walls.

10. The apparatus according to claim 1 wherein said bag has a generally rectangular parallelepiped configuration.

11. A method for utilizing a collapsible glove bag to contain and dispose of hazardous material such as asbestos particles released during work on a pipe section located in work space enclosed and defined by said glove bag, said method comprising the steps of:

(a) providing continuous negative ventilation through said glove bag via an exhaust, without collapsing said glove bag, port while work is being done on said pipe section;

(b) providing ambient air through an air inlet port in said glove bag to replace air exhausted from said glove bag in step (a); and (c) filtering air with a high efficiency particulate air filter at said inlet port to prevent hazardous material from escaping from said glove bag via said inlet port.

12. The method according to claim 11 further comprising the step of:

(d) filtering air with a high speed particulate air filter at said exhaust port to collect hazardous material and prevent it from egressing from said glove bag via said exhaust port.

13. The method according to claim 12 further comprising the steps of reinforcing a bottom portion of said glove bag to prevent that portion from collapsing due to negative pressure created by the continuous negative ventilation.

14. The method according to claim 13 wherein said step of reinforcing includes placing a reinforcement insert panel at the bottom of said glove bag.

15. The method according to claim 14 wherein said step of reinforcing additionally includes configuring said glove bag as a generally rectangular parallelepiped.

16. The method according to claim 11 further comprising the steps of reinforcing a bottom portion of said glove bag to prevent that portion from collapsing due to negative pressure created by the continuous negative ventilation.

17. The method according to claim 16 wherein said step of reinforcing includes placing a reinforcement insert panel at the bottom of said glove bag.

18. The method according to claim 17 wherein said step of reinforcing additionally includes configuring said glove bag as a generally rectangular parallelepiped.

19. The method according to claim 14 wherein said step of reinforcing additionally includes configuring said glove bag as a generally rectangular parallelepiped.

20. The method according to claim 11 further comprising the step of collapsing and disposing of said glove bag and hazardous material therein after a single use.

* * * * *